Patented Dec. 1, 1925.

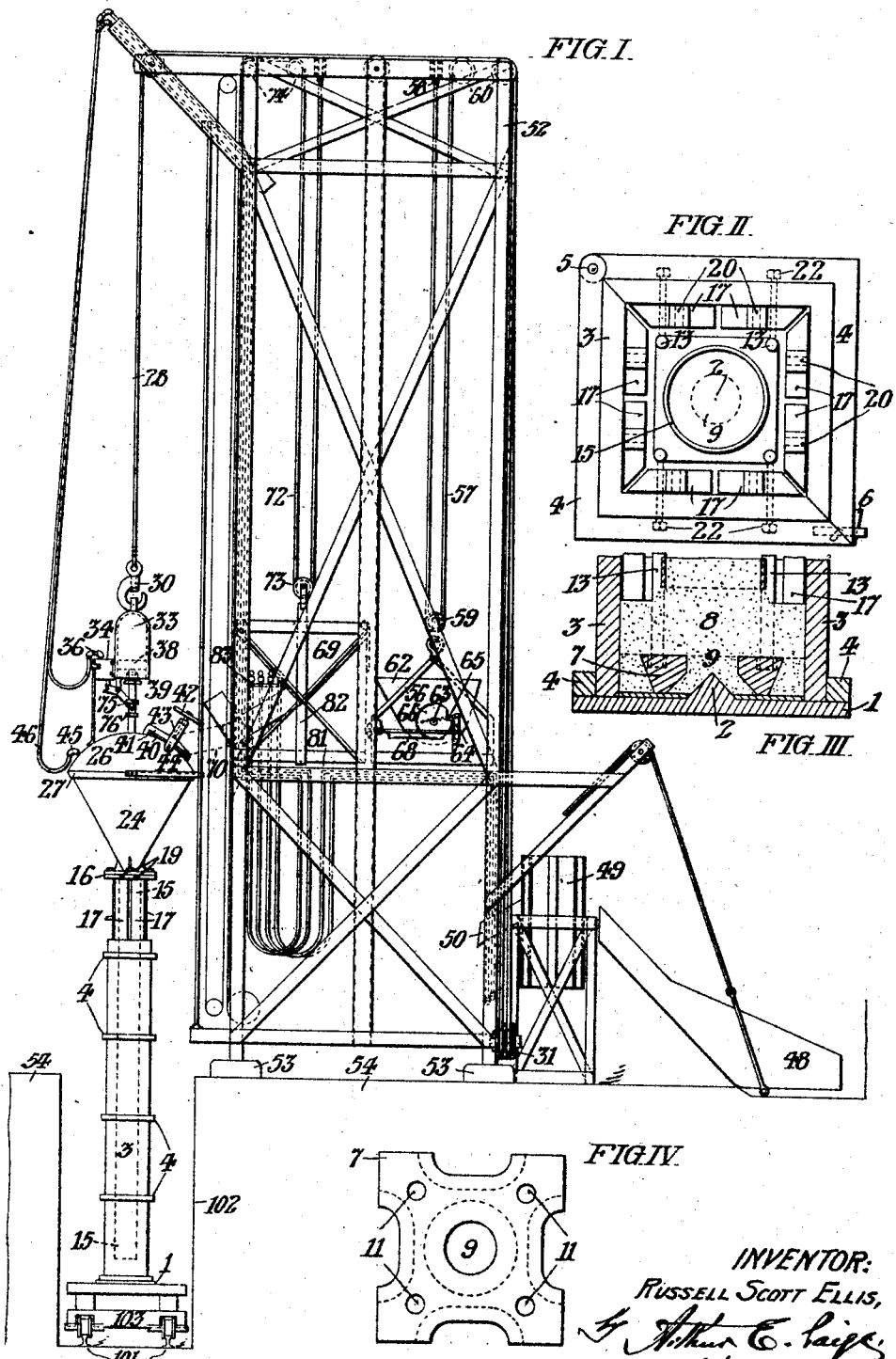

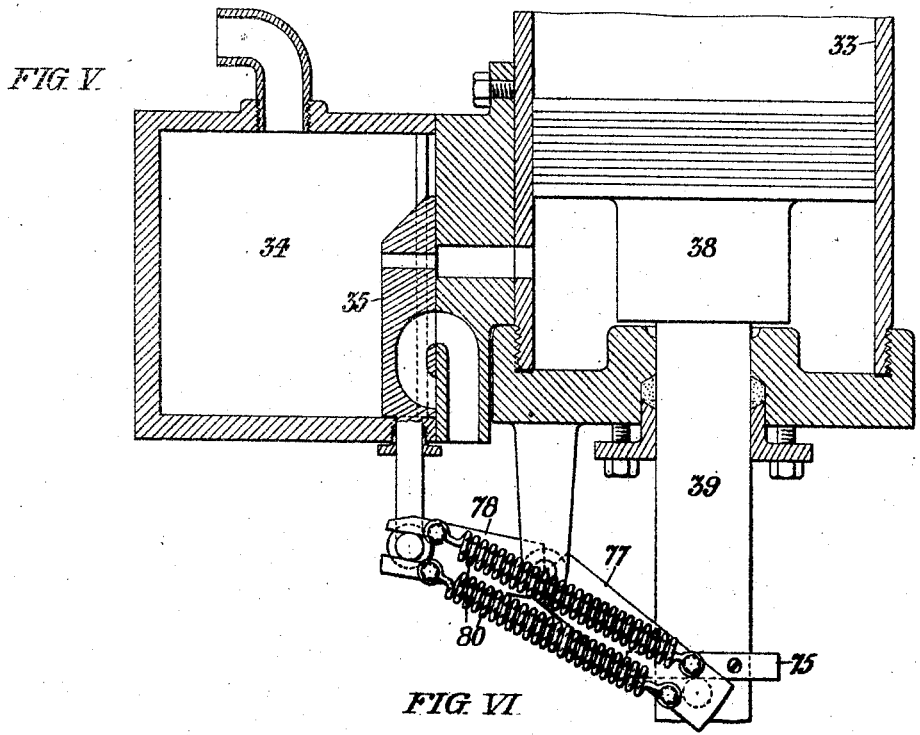
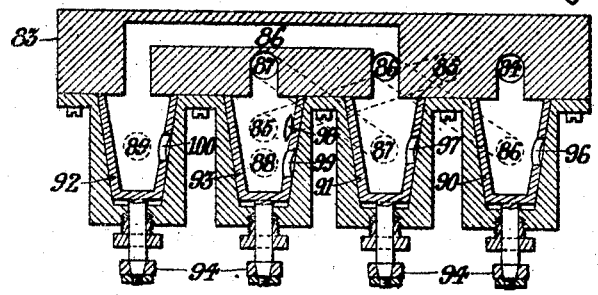
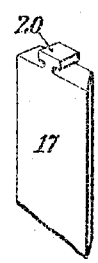

1,563,615

UNITED STATES PATENT OFFICE.

RUSSELL SCOTT ELLIS, OF PHILADELPHIA, PENNSYLVANIA.

CONCRETE-MOLDING APPARATUS.

Application filed February 25, 1925. Serial No. 11,419.

*To all whom it may concern:*

Be it known that I, RUSSELL SCOTT ELLIS, a citizen of the United States, residing at Philadelphia, in the county of Philadelphia and State of Pennsylvania, have invented a certain new and useful Improvement in Concrete-Molding Apparatus, whereof the following is a specification, reference being had to the accompanying drawings.

My invention is particularly designed and adapted for molding lengthy articles of comparatively small diameter, such as building columns and piles. Heretofore, considerable difficulty has been experienced in molding such articles of uniform texture. That is to say; in the employment of the ordinary methods of molding such articles, there is a large percentage of loss owing to voids in the molds incident to lack of efficiency in the means for ramming the concrete aggregate into the molds. Moreover, attempts to reinforce such molded articles with metallic members have been hitherto unsatisfactory, because of the difficulty in precisely locating such elements in predetermined position in the finished article; it being necessary to cover such metal reinforcements with approximately two inches thickness of concrete to prevent corrosion and destruction of such members upon exposure of the column or pile to water which will percolate through the porous structure of the concrete to approximately that extent.

Therefore, an object and effect of my invention is to provide efficient means for insuring the proper filling of the molds and at such speed as to minimize the cost of that operation.

As hereinafter described; my invention includes an organized molding apparatus to which vertically extending molds are presented in succession, by means of a wheeled truck, also serving to remove the molds with the articles cast therein. Said apparatus includes a vertically extending tower and elevator mechanism mounted therein, adjustable for different heights of molds and including a hopper and chute for delivery of the mixed concrete into the upper ends of said molds; said hopper being conveniently charged by an endless conveyor extending to a rotary concrete mixer adjacent to the base of said tower.

Said tower supports a vertically adjustable plunger mechanism, including a central filling conduit surrounded by ramming elements extending parallel with said conduit and adapted to fit within the mold. Said conduit and rammers are detachably rigidly connected with a header which is conveniently funnel shaped to receive and transmit the concrete aggregate to the conduit and is provided with a cover which may be hermetically sealed so that the contents of the mold may be selectively subjected to fluid pressure, alternately positive and negative; to wit, plenum to compress the concrete aggregate, and exhaust to remove air bubbles involved in such aggregate. Said header with its appurtenant conduit and rammers is not only provided with flexible suspending means by which it may be raised and lowered, but is also provided with means whereby it may be jolted vertically, by fluid pressure, with a hammering effect upon the rammers and the concrete in the mold.

My invention also includes features of construction and arrangement of the mold and its appurtenances, whereby reinforcing metallic elements may be accurately located in predetermined position in the cast articles.

An adjunctive feature of my invention is valve means for controlling the elevating, hammering and pressure devices aforesaid, which may be operated automatically or semi-automatically, to facilitate the molding operation for quantity production.

My invention includes the various novel features of construction and arrangement hereinafter more definitely specified.

In said drawings; Fig. I is a diagrammatic elevation of an apparatus conveniently embodying my invention.

Fig. II is a transverse sectional view, taken on the line, II, II in Fig. I, but on a larger scale, showing the construction and arrangement of the mold, filling conduit and ramming elements indicated in Fig. I.

Fig. III is a fragmentary vertical, sectional view of the base of said mold, with a precast tile therein which forms the permanent base of the articles to be molded.

Fig. IV is a plan view of the precast tile shown in section in Fig. III.

Fig. V is a vertical sectional view of part of the apparatus indicated in Fig. I, showing the construction and arrangement of a convenient form of slide valve mechanism.

Fig. VI is a sectional view of a convenient form of rotary valve mechanism for controlling the fluid pressure in said apparatus.

Fig. VII is a fragmentary perspective view of the upper end of one of said ramming elements.

In said figures; the mold comprises a metallic base plate 1 having the centering projection 2, arranged to form a centering spot in the bottom of the molded article. The mold walls are conveniently formed of complementary side panels 3 which are detachably assembled in and held by a series of girdle clamps 4, each hingedly connected at 5, and provided with adjustable fastening means, including a wedge pin 6. Precast tiles 7 are designed to be successively centered in the mold but ultimately permanently attached to the lower end of respective molded articles 8. Said tile 7 has the central recess 9 surrounding said centering projection 2 and marginal recess 10 through which the concrete flows to inseparably hold said tile, which also has registering recesses 11 in the top thereof for registering with and determining the position of the reinforcing metal members 13 which are included in integral relation with said molded article 8.

The tubular filling conduit 15 is fitted to reciprocate in said mold and provided with the cross head 16 at the top thereof. Each of the annular series of ramming elements 17 is detachably secured to said head in parallel relation with and around said conduit. I find it convenient to provide means on said head arranged to detachably secure said ramming elements 17 in radially adjustable relation therewith, including undercut slots 19 in said head fitted to complementary members 20 on said ramming elements. Said head has screw members 22 adapted to detachably secure and support said metallic rod reinforcing elements 13 in registry with said recesses 11 in said tile 7 whereby said reinforcing members are held in predetermined relation with said mold during the molding operation so as to precisely predetermine their position in the finished molded article 8.

The funnel header 24 is detachably rigidly connected with said cross head 16 in communication with said conduit 15 and provided with the removable cover 26 including means 27 arranged to hermetically seal it in connection with said funnel and conduit, when desired.

In order to effect and control the vertical reciprocatory movement of said rammers 17 and their appurtenances above described; I find it convenient to provide a hoisting device including the flexible connector 28 which is operatively connected with said funnel cover 26 by the detachable hook 30. Said connector may extend to a winch 31 or any other convenient means for manipulating it. However, I prefer to combine with such hoisting device means to jolt said conduit and rammers up and down and, therefore, interposed between said hook 30 and said cover 26, in rigid relation with the latter, the fluid pressure cylinder 33 and valve chest 34, the latter containing the slide valve 35 for controlling the admission of fluid pressure through the conduit 36, and exhaust of the same to lift and drop the piston 38, which is provided with the rod 39 which extends in said conduit 15 and serves to mechanically force the concrete aggregate downward through the latter, at the will of the operator.

Said cover 26 has the port 40 through which the concrete mixture may be supplied to said funnel header 24 and conduit 15, and I find it convenient to provide said port 40 with the hinged lid 41, which may be hermetically sealed thereon by means of the screw 42 which extends through the yoke 43, which is pivoted at 44 on said cover, so that water, air or other fluid under pressure may then be introduced to said cover and funnel, above the concrete mixture, to force the latter downwardly into the mold; and a partial vacuum thereafter created in said mold, to exhaust the inclined air bubbles. For that purpose, I provide said cover with the fluid inlet 45 adapted to be alternately connected, by the flexible conduit 46, with a source of fluid pressure and with a vacuum tank.

I find it convenient to primarily deposit the ingredients of the concrete mixture in the boot 48 and to thereafter dump the same into the rotary mixer 49 from which the mixed concrete is delivered through the chute 50. In order to facilitate the transfer of the mixed concrete from said chute 50 to said port 40 at the top of the mold and provide means for effecting such transfer with the funnel header 24 at different heights, in accordance with the length of the article 8 to be cast; I provide the tower formed of metal members 52, conveniently erected upon foundations 53 set in the ground 54. Said tower includes supports for the elevator cage 56 which is suspended by the flexible connector 57 which has one end fastened to said tower at 58 and extends through the tackle block 59 and thence around sheaves 60 to a suitable winch or equivalent thereof. Said cage 56 supports the scoop 62 which is pivoted at 63 and provided with tripping mechanism including the latch lever 64 which engages the notch 65 in the gear 66 on the side of said scoop. There are two of said gears 66 upon respectively opposite sides of said scoop and respectively adapted to roll in engagement with racks 68 which are fixed in said cage 56; the arrangement being such that when said latch lever 64 is tripped; said scoop may be simultaneously tilted and rolled to the left to dump its contents into the hopper 69 which is provided with the chute 70 adjustable to and away from said port 40. Said hopper 69 is adapted to be raised and lowered in said tower 52 by the flexible connector 72 which is attached at one end to said tower and extends around the tackle block 73 and sheaves 74 to a suitable winch or equivalent thereof.

As shown in Fig. V; said slide valve 35 is mounted to reciprocate in said valve chest 34 parallel with said piston rod 39 and arranged to be automatically operated as a consequence of the reciprocatory movement of said rod 39, by providing the latter with adjustable collars 75 and 76 which are arranged to alternately strike the tappet lever 77 which is connected with the valve lever 78 by springs 80 so that said lever 78 and valve 35 are operated with a snap action to reverse the position of said slide valve 35 at the end of each up and down stroke of said piston 38; so that the latter is thus automatically operated. The length of stroke of said piston is variably determinable by the position to which said collars 75 and 76 are set.

In order to facilitate the manipulation of said apparatus, I provide said tower with the operator's platform 81, which may be attached to the frame 82 which supports said hopper 69; so that said platform may be raised and lowered with said hopper, which is conveniently located in the remote left hand corner of the tower, as seen in Fig I. As indicated in said figure; I provide valve controlling means, above said platform 81, including the base 83 adjoining said hopper 69, and which may be manipulated to supply the fluid pressure for the several purposes above described.

As shown in Fig. VI; said base 83 has the pressure conduit 84, exhaust conduit 86, and other conduits 87, 88 and 89, and rotary valves 90, 91, 92 and 93, which latter may be independently turned by handles 94, to introduce fluid pressure and exhaust the same with respect to the several devices aforesaid. For instance, said pressure conduit 84 may lead to a pump or other source of compressed air or other fluid and said exhaust conduit 85 may lead to a vacuum tank. Said valve 90, the interior of which is in communication with said pressure conduit 84, has the port 96 in its circumference, adapted to register with the conduit 86 which leads to the interior of both of said valves 91 and 92. Said valve 91 has the port 97 in its circumference adapted to register with the conduit 87 which leads to the interior of the valve 93 and the latter has the port 98 in its circumference adapted to register with said exhaust conduit 85, and also has the port 99 in its circumference adapted to register with the conduit 88 which is in communication with said flexible conduit 46 leading to said mold cover 26; whereby the contents of said mold may be subjected to fluid pressure or exhaust, for the purposes above contemplated. Said valve 92 has the port 100 in its circumference adapted to register with the conduit 89 leading to said valve chest 34.

Of course, such molds as above described, or other molds of any suitable construction, may be presented in proper position in said apparatus to be filled, and be removed, by any convenient means. However, I prefer to provide a railway track 101 extending below the ground level 54 in the cut 102, and to provide a series of trucks 103 adapted to roll upon said track and present the molds in the position shown in Fig. I; said trucks being used to successively convey a series of molds to and from that position.

However, it is to be understood that I do not desire to limit myself to the precise details of construction and arrangement herein set forth, as it is obvious that various modifications may be made therein without departing from the essential features of my invention, as defined in the appended claims.

I claim:

1. In concrete molding apparatus, the combination with a metallic mold base plate, having a centering projection at the center thereof; of oppositely counterpart metallic mold members hingedly connected and fitted to said base plate; a precast tile adapted to fit in said mold upon said base plate, and having a central seat arranged to fit said base projection; and having recesses in the top thereof for reinforcing members; a tubular filling conduit fitted to reciprocate in said mold; a cross head at the top of said conduit; an annular series of ramming elements detachably secured to said head and extending in said mold in a series around said conduit; means, on said head, arranged to detachably secure said ramming elements in radially adjustable relation therewith including undercut slots in said head fitted to complementary members on said ramming elements; means on said head arranged to detachably secure and support metallic rod reinforcing elements in registry with the recesses in said tile; whereby said reinforcing members are held in predetermined relation with said mold during the molding operation; a funnel header detachably rigidly connected with said cross head in communication with said conduit; a cover for said funnel, including means arranged to hermetically seal it in connection with said funnel and conduit; and means including a hoisting device; whereby said conduit and ramming elements may be raised and lowered with respect to said mold; means arranged to jolt said ramming elements, including a cylinder and piston and valve means arranged to admit fluid pressure in operative relation therewith; means arranged to subject the contents of said funnel and conduit to fluid pressure, including a flexible conduit operatively connected therewith; and valve means controlling the admission of fluid pressure thereto; said cover having an inlet port and removable means arranged to hermetically seal the same; means arranged to supply the concrete aggregate through said port, into said funnel and conduit, including a hopper, a chute adjustable therefrom to said port, and elevating means arranged to raise and lower said hopper, including a vertically movable platform supporting the same; a tower, housing said hopper and elevating means; a concrete mixer including a rotary drum at the base of said tower; a chute from said mixer; means arranged to convey concrete aggregate from said mixer to said hopper, including a vertically adjustable elevator cage, a scoop tiltably mounted in said cage and a tilting device for said scoop.

2. In concrete molding apparatus, the combination with a metallic mold base plate, having centering means; of complementary metallic mold members separably connected and fitted to said base plate; a precast tile adapted to fit said centering means in said mold upon said base plate, and having registering recesses for reinforcing members; a tubular filling conduit fitted to reciprocate in said mold; a cross head at the top of said conduit; an annular series of ramming elements detachably secured to said head and extending in said mold in a series around said conduit; means, on said head, arranged to detachably secure said ramming elements in radially adjustable relation therewith; means on said head arranged to detachably secure and support metallic rod reinforcing elements registered in the recesses in said tile; whereby said reinforcing members are held in predetermined relation with said mold during the molding operation; a funnel header connected with said cross head in communication with said conduit; a cover for said funnel, including means arranged to hermetically seal it in connection with said funnel and conduit; and means whereby said conduit and ramming elements may be raised and lowered with respect to said mold; means arranged to jolt said ramming elements; means arranged to subject the contents of said funnel and conduit to fluid pressure including a flexible conduit operatively connected therewith; and valve means controlling the admission of fluid pressure thereto; said cover having an inlet port and removable means arranged to hermetically seal the same; means arranged to supply the concrete aggregate through said port, into said funnel and conduit, including elevating means.

3. In concrete molding apparatus, the combination with a metallic mold base plate; of complementary metallic mold members separably connected and fitted to said base plate; a tubular filling conduit fitted to reciprocate in said mold; a cross head at the top of said conduit; ramming elements secured to said head and extending in said mold outside said conduit; means on said head arranged to detachably secure and support metallic rod reinforcing elements; whereby said reinforcing members are held in predetermined relation with said mold during the molding operation; a funnel header connected with said cross head in communication with said conduit; means whereby said conduit and ramming elements may be raised and lowered with respect to said mold; and means arranged to jolt said ramming elements.

4. In concrete molding apparatus, the combination with a metallic mold base plate; of complementary metallic mold members separably connected and fitted to said base plate; a tubular filling conduit fitted to reciprocate in said mold; a cross head at the top of said conduit; ramming elements secured to said head and extending in said mold outside said conduit; means on said head arranged to detachably secure and support metallic rod reinforcing elements; whereby said reinforcing members are held in predetermined relation with said mold during the molding operation; a funnel header connected with said cross head in communication with said conduit; and means whereby said conduit and ramming elements may be raised and lowered with respect to said mold.

5. In concrete molding apparatus, the combination with a metallic mold base plate; of complementary metallic mold members separably connected and fitted to said base plate; a tubular filling conduit fitted to reciprocate in said mold; a cross head at the top of said conduit; ramming elements secured to said head and extending in said mold outside said conduit; a funnel header connected with said cross head in communication with said conduit; means whereby said conduit and ramming elements may be raised and lowered with respect to said mold; and means arranged to jolt said ramming elements.

6. In concrete molding apparatus, the combination with a metallic mold base plate; of complementary metallic mold members separably connected and fitted to said base plate; a tubular filling conduit fitted to reciprocate in said mold; a cross head at the top of said conduit; ramming elements secured to said head and extending in said mold outside said conduit; a funnel header connected with said cross head in communication with said conduit; and means whereby said conduit and ramming elements may be raised and lowered with respect to said mold.

7. In concrete molding apparatus, the combination with a metallic mold base plate; of oppositely counterpart metallic mold members hingedly connected and fitted to said base plate; a tubular filling conduit fitted to reciprocate in said mold; a cross head at the top of said conduit; a ramming element detachably secured to said head and extending in said mold; means on said head arranged to detachably secure and support metallic rod reinforcing elements in proper position to be embodied in the molded article; whereby said reinforcing members are held in predetermined relation with said mold during the molding operation; a funnel header connected with said cross head in communication with said conduit; and means including a hoisting device; whereby said conduit and ramming element may be raised and lowered with respect to said mold; means arranged to jolt said ramming element, including a cylinder and piston, and valve means arranged to admit fluid pressure in operative relation therewith; means arranged to subject the contents of said funnel and conduit to fluid pressure; and valve means controlling the admission of fluid pressure thereto.

8. In concrete molding apparatus, the combination with a metallic mold base plate; of oppositely counterpart metallic mold members hingedly connected and fitted to said base plate; a tubular filling conduit fitted to reciprocate in said mold; a cross head at the top of said conduit; a ramming element detachably secured to said head and extending in said mold; means on said head arranged to detachably secure and support metallic rod reinforcing elements in proper position to be embodied in the molded article; whereby said reinforcing members are held in predetermined relation with said mold during the molding operation; a funnel header connected with said cross head in communication with said conduit; means including a hoisting device; whereby said conduit and ramming element may be raised and lowered with respect to said mold; and means arranged to jolt said ramming element, including a cylinder and piston, and valve means arranged to admit fluid pressure in operative relation therewith.

9. In concrete molding apparatus, the combination with a metallic mold base plate; of oppositely counterpart metallic mold members hingedly connected and fitted to said base plate; a tubular filling conduit fitted to reciprocate in said mold; a cross head at the top of said conduit; a ramming element detachably secured to said head and extending in said mold; means on said head arranged to detachably secure and support metallic rod reinforcing elements in proper position to be embodied in the molded article; whereby said reinforcing members are held in predetermined relation with said mold during the molding operation; a funnel header connected with said cross head in communication with said conduit; and means including a hoisting device; whereby said conduit and ramming element may be raised and lowered with respect to said mold.

10. In concrete molding apparatus, the combination with a metallic mold base plate; of oppositely counterpart metallic mold members hingedly connected and fitted to said base plate; a tubular filling conduit fitted to reciprocate in said mold; a cross head at the top of said conduit; an annular series of ramming elements detachably secured to said head and extending in said mold in a series around said conduit; means, on said head, arranged to detachably secure said ramming elements in radially adjustable relation therewith, including under cut slots in said head fitted to complementary members on said ramming elements; means on said head arranged to detachably secure and support metallic rod reinforcing elements; and means including a hoisting device; whereby said conduit and ramming elements may be raised and lowered with respect to said mold.

11. In concrete molding apparatus, the combination with a metallic mold base plate; of oppositely counterpart metallic mold members hingedly connected and fitted to said base plate; a tubular filling conduit fitted to reciprocate in said mold; a cross head at the top of said conduit; an annular series of ramming elements detachably secured to said head and extending in said mold in a series around said conduit; means, on said head, arranged to detachably secure said ramming elements in radially adjustable relation therewith, including under cut slots in said head fitted to complementary members on said ramming elements; and means including a hoisting device; whereby said conduit and ramming elements may be raised and lowered with respect to said mold.

12. In concrete molding apparatus, the combination with a metallic mold base plate; of oppositely counterpart metallic mold members hingedly connected and fitted to said base plate; a tubular filling conduit fitted to reciprocate in said mold; a cross head at the top of said conduit; an annular series of ramming elements detachably secured to said head and extending in said mold in a series around said conduit; means, on said head, arranged to detachably secure said ramming elements in radially adjustable relation therewith; and means including a hoisting device; whereby said conduit and ramming elements may be raised and lowered with respect to said mold.

13. In concrete molding apparatus, the combination with a metallic mold base plate; of oppositely counterpart metallic mold members hingedly connected and fitted to said base plate; a tubular filling conduit fitted to reciprocate in said mold; a cross head at the top of said conduit; an annular series of ramming elements detachably secured to said head and extending in said mold in a series around said conduit; means on said head arranged to detachably secure and support metallic rod reinforcing elements; and means including a hoisting device; whereby said conduit and ramming elements may be raised and lowered with respect to said mold.

14. In concrete molding apparatus, the combination with a metallic mold base plate; of oppositely counterpart metallic mold members hingedly connected and fitted to said base plate; a tubular filling conduit fitted to reciprocate in said mold; a cross head at the top of said conduit; an annular series of ramming elements detachably secured to said head and extending in said mold in a series around said conduit; and means including a hoisting device; whereby said conduit and ramming elements may be raised and lowered with respect to said mold.

15. In concrete molding apparatus, the combination with a metallic mold base plate, having a centering projection at the center thereof; of a precast tile, part of the article to be molded, adapted to fit upon said base plate, and having a central seat arranged to fit said projection; and having recesses in the top thereof for reinforcing members, to be left in the molded article; a mold fitted to said base plate around said tile; and means arranged to support the upper ends of reinforcing members, in registry with the recesses in said tile and in predetermined position in said mold.

16. In concrete molding apparatus, a precast tile, adapted to ultimately form part of the molded article, and having recesses arranged to locate reinforcing members in said article in predetermined position; in combination with a mold member having means to support such reinforcing members, in registry with the recesses in said tile.

17. In concrete molding apparatus, a precast tile, adapted to ultimately form part of the molded article, and having recesses arranged to locate reinforcing members in said article in predetermined position.

18. In concrete molding apparatus, the combination with a mold having a hermetically sealed removable cover; of means arranged to alternately subject the contents of said mold to fluid pressure and a partial vacuum including a conduit extending from said cover, a source of fluid pressure and a vacuum tank, and valve means movable to control communication between said mold, said source and said tank.

19. In concrete molding apparatus, the combination with a hermetically sealed mold; of means arranged to alternately subject the contents of said mold to fluid pressure and a partial vacuum including a conduit extending from said mold, a source of fluid pressure and a vacuum tank, and valve means movable to control communication between said mold, said source and said tank.

20. In concrete molding apparatus, the combination with a mold; of means arranged to alternately subject the contents of said mold to fluid pressure and a partial vacuum including a conduit extending from said mold, a source of fluid pressure and exhausting means, and valve means movable to control communication between said mold, said source and said exhausting means.

In testimony whereof, I have hereunto signed my name at Philadelphia, Pennsylvania, this twenty-third day of February, 1925.

RUSSELL SCOTT ELLIS.